Oct. 26, 1954
R. H. BURKHARD
2,692,744
AIRCRAFT CARGO HANDLING SYSTEM
Filed Sept. 27, 1947
4 Sheets-Sheet 1
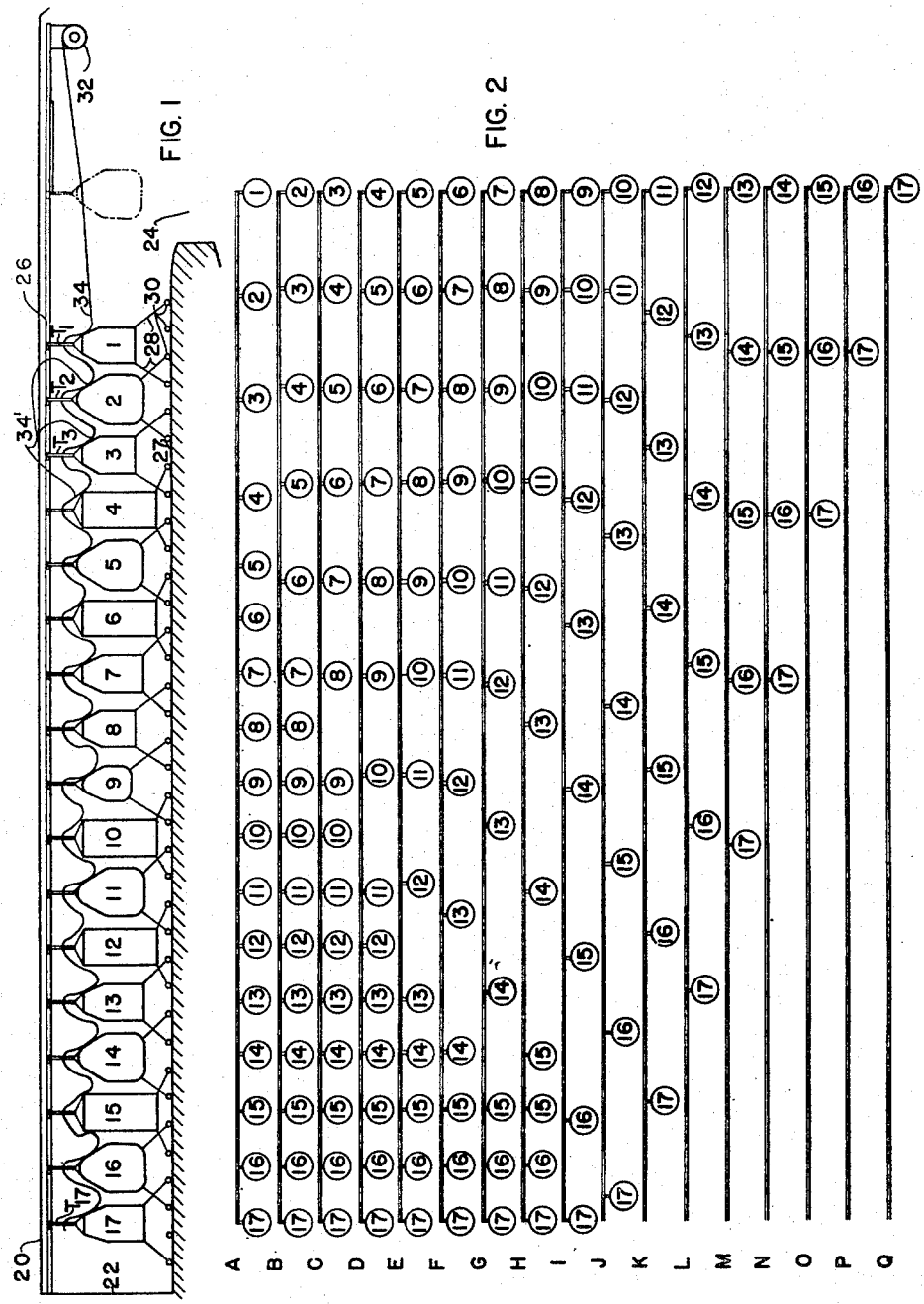
INVENTOR.
RALPH H. BURKHARD
BY
Reynolds & Beach
ATTORNEYS INVENTOR.
RALPH H. BURKHARD
BY
Reynolds & Beach
ATTORNEYS Oct. 26, 1954 R. H. BURKHARD 2,692,744
AIRCRAFT CARGO HANDLING SYSTEM
Filed Sept. 27, 1947 4 Sheets-Sheet 3

INVENTOR.
RALPH H. BURKHARD
BY
Reynolds + Beach
ATTORNEYS

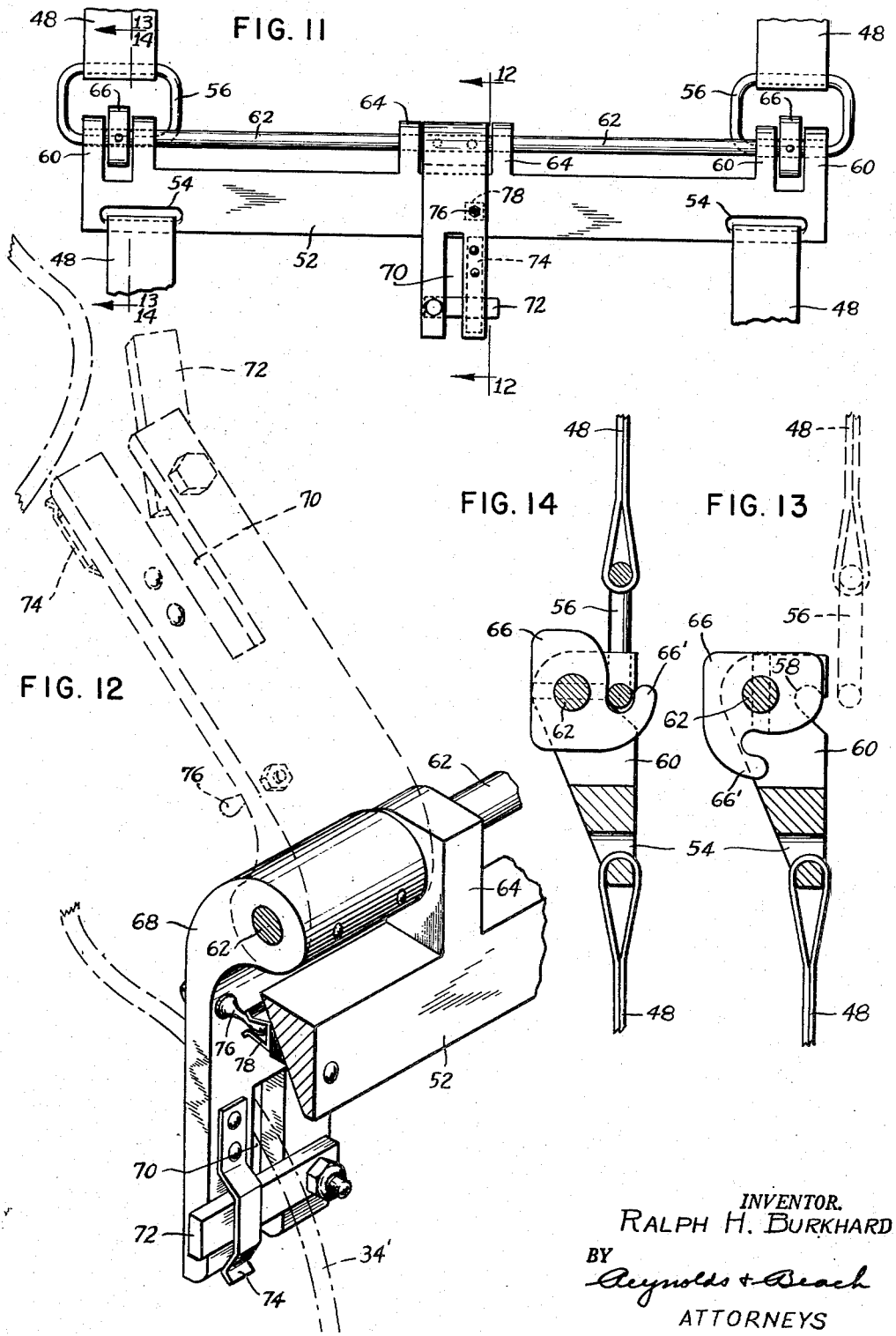

Patented Oct. 26, 1954

2,692,744

UNITED STATES PATENT OFFICE 2,692,744

AIRCRAFT CARGO HANDLING SYSTEM

Ralph H. Burkhard, Seattle, Wash., assignor to Boeing Airplane Company, a corporation of Delaware Application September 27, 1947, Serial No. 776,466

19 Claims. (Cl. 244—137)

This invention relates to cargo carrying aircraft, or the like, especially adapted for discharge of cargo while in flight. More particularly the invention concerns a system and means for unloading such aircraft by remote control quickly and with safety.

It is frequently desirable, especially in the course of military operations, to discharge an airplane's process cargo while in flight. In military action, for example, it is most urgent that the cargo be discharged in the briefest possible time, both to minimize the possibility of effective enemy opposition, and to drop the units of cargo into as small a ground area as possible in a single passing of the aircraft. With conventional aircraft, which have been used a great deal for such purposes, in many cases the cargo has simply been pushed overboard by the aircraft's crew. Obviously the size and weight of individual packages of cargo which may be handled in this manner are limited under such conditions, and the time required to drop a large cargo is often prohibitive. In addition the operation is relatively dangerous to the crew members.

Accordingly, it is an important object of this invention to provide facilities for dropping air cargo contained in multiple packages very rapidly and essentially automatically without the necessity of being handled by the crew.

A further important consideration concerns the uninterrupted, efficient and safe operation of the carrier aircraft as cargo is dropped, by the maintenance of the proper weight distribution of the cargo remaining during a progressive unloading operation, affecting the balance of the aircraft. In order to maintain efficient and safe flight conditions during such an operation, the center of gravity of the entire airplane, including its cargo, must be held within a rather limited range fore and aft of the fuselage; otherwise the aircraft becomes longitudinally unstable and difficult to maintain in level flight by operation of the flight controls, a condition which must be avoided. Modern large cargo aircraft and those planned for the future may carry units or packages of cargo weighing from a hundred pounds up to a ton, and the total load may be as much as ten or fifteen tons. Clearly, the removal of even a substantial portion of such a distributed load from an airplane, however large it may be practically, if not compensated simultaneously by proper redistribution of the remaining cargo can have a severe effect upon the location of the center of gravity, and therefore upon the flight characteristics, of the airplane.

Consequently it is an important object of this invention to provide a cargo releasing system by which units or packages of cargo may be released quickly and easily in discharging the load progressively, and means effective to redistribute continuously enough of the diminishing remainder of the cargo within the aircraft automatically to keep the center of gravity of the aircraft located well within safe or efficient limits.

Other objects include the effective utilization of storage space within the hold of the loaded aircraft, with the load units securely fastened in place during flight and readily releasable for rapid movement toward the discharge opening for dropping, or for the repositioning of certain load units to preserve the center of gravity of the aircraft substantially unchanged as other load units are discharged.

A further object concerns providing a system of this nature which is sufficiently flexible in design as to be used in a variety of applications, and which in a particular installation may be adjustable to distribute the load initially, and to redistribute the load during unloading, as may be desired to establish and to maintain a proper balance of the airplane despite variations in the size and weight of the load packages in different loads, or a range of package sizes and weights constituting a particular load.

The invention is presented herein in its application to cargo aircraft of the type in which the cargo is all released through a bottom opening preferably near one end of the aircraft's fuselage, by moving the cargo longitudinally for discharge through the opening, but it should be understood that the opening may be otherwise located; for example the cargo may be distributed at opposite sides of the opening, or several discharge openings may be provided, or the discharge opening may be in the side of the fuselage. Also the invention may be useful in other types of vessels or vehicles. The various features of the invention and the details of a preferred system or method and means by which it may be practiced and implemented will now be considered more fully in connection with the accompanying drawings.

Figure 1 is a simplified diagrammatic side elevation view showing the arrangement of cargo within an aircraft compartment in accordance with the preferred practice of the invention.

Figure 2 is a diagram graphically showing successive stages in a typical unloading operation.

Figure 6:
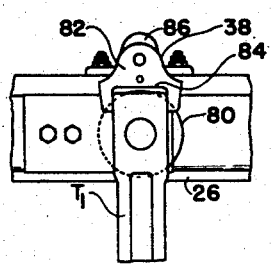
Figure 7:
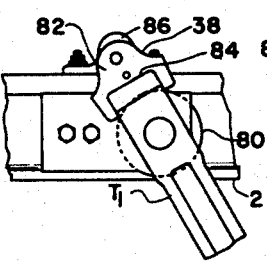
Figure 8:
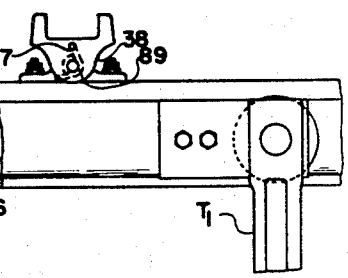

Figures 6, 7, and 8 are fragmentary side elevation views of a latch for load-carrying mechanism illustrating it in secured, partially released, and fully released positions, respectively.

Figure 9:
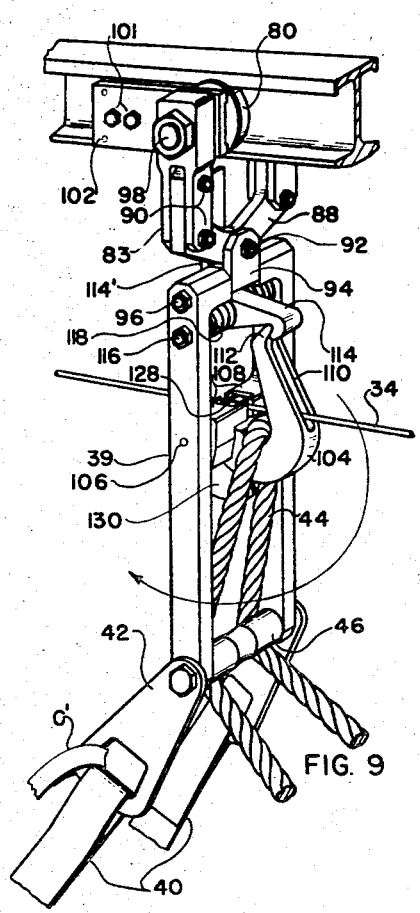
Figure 10:
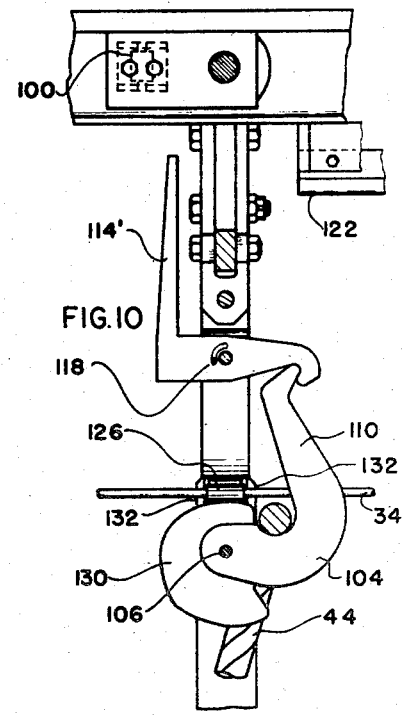

Figures 9 and 10 are a detail perspective view and a side elevation view partially in section, respectively, of load-carrying mechanism.

Figure 11 is a front view, and Figures 12, 13 and 14 are sectional views, Figure 12 being taken on line 12—12, and Figures 13 and 14 on line 13—14, of Figure 11, of releasing means connected to the bundle, or load unit, floor connections, illustrating successive stages of the load freeing operation.

Figure 1 illustrates diagrammatically an exemplary arrangement of cargo in the cargo compartment of a large airplane 20. The cargo compartment may extend from a forward bulkhead 22, adjacent to the crew compartment, for example, rearwardly substantially to the tail of the craft. At the rearward end of this compartment a loading hatch or opening 24 in the lower portion of the fuselage is provided for loading and unloading the cargo. The cargo may be made up, as shown, of a number of different bundles or units, designated 1, 2, 3, ... 17, preferably of approximately the same order of size and weight and hung individually from trolleys T1, T2, T3, ... T17, respectively, movable on an overhead monorail 26 extending lengthwise of the airplane from one end of the cargo compartment which it serves, to the other, and passing over the discharge hatch.

When the aircraft is loaded each bundle (or group of bundles), suspended from the trolleys, is anchored in its proper place longitudinally of the fuselage by tie-down ropes 28 secured to hooks or rings 30 fastened to the floor 27 of the compartment, to prevent undue swaying and jostling of the bundles during flight. The trolleys themselves are also then locked in position along the track by mechanism which will be described in detail later herein. The locations of the individual load units are subject to any predetermined loading order, such as in accordance with a plan based upon the relative weights or sizes of the load units and the positions they must occupy to establish the center of gravity at an approximate point, or the desired order of their release from the aircraft.

Located at the rear of the compartment is a power driven winch 32, shown in Figure 1, although a manual winch may be used, from which a tow cable 34, wound on the winch drum, leads forward through the compartment along the row of bundles. At each bundle the cable is releasably attached to or linked with a tie-down release device 50 (Figure 3) and is gripped or held by the trolley at the proper point by cable-holding means connected to the supporting trolley, leaving predetermined amounts of slack cable 34' draped between successive load bundles or trolleys. The section of cable between the winch and No. 1 load package is also left slack for a purpose to be described.

The general operation of this system during unloading is as follows: As the winch is started, reeling in cable, the slack in the cable between the winch and first bundle is first wound up. As this occurs and the cable begins to tauten the effect is to trip the release of the tie-down device 50 associated with such first bundle, freeing that bundle from its anchoring connections to the floor. Further tautening of the cable by the winch swings the bundle 1 and trolley T1 rearwardly toward the winch, thereby automatically releasing the trolley locking means to enable the trolley to move along the track 26, which it does with continued operation of the winch, drawing it rearwardly toward the discharge hatch. When the trolley reaches a certain position over the hatch opening, it strikes an abutment, operating release mechanism to free the load unit from its supporting trolley for dropping from the aircraft.

In the meantime, the amount of cable wound up by the winch in bringing bundle 1 into dropping position is sufficient that the slack cable between it and the next bundle has been taken up, initiating a duplicate series of release, moving and discharging operations for the second bundle. Depending upon the distances involved in the particular installation, dropping package 1 may entail the accompanying release and shift of one or several succeeding packages. A progressive chain of similar operations spreads through the entire row of trolleys ultimately as the unloading progresses, until all of the bundles have been released and the last one is set in motion toward the discharge hatch. With this occurrence all of the bundles not dropped move toward the opening uniformly. The amount of slack cable provided between the bundles is so selected that, as the unloading progresses, a concomitant progressive redistribution or shift of the bundles towards the unloading point occurs automatically, thereby alleviating or preventing a substantial shift in the center of gravity of the aircraft from the center of gravity location of the original load toward a different location, such as would have occurred if the load were not redistributed.

The foregoing action is illustrated diagrammatically in Figure 2, which shows the progressive positions assumed by the various load packages at a number of stages, A, B, C, etc., in the course of an unloading operation. The uppermost line, A, of this figure illustrates the positions of the load units at the instant bundle 1 reaches the discharge point, immediately above the hatch 24, represented by the right end of line A. It will be seen that packages 2, 3 and 4 have all at this juncture been released from their tie-down ropes and have been moved rearwardly in progressively increased amounts accompanying the travel of load 1 to its discharge point. The second line, B, of Figure 2, depicts bundle 2 reaching the discharge point, and bundles 3, 4, 5 and 6 then released and moving aft. By the time unit 9 reaches the discharge point, shown in line I, all of the packages except the last, 17, have been released and have begun to move. This last bundle has started its travel by the time bundle 10 reaches the discharge point. Following discharge of bundle 10, in the exemplary case, all the remaining bundles, 11 to 17, inclusive, move rearward at the same rate, since the sections of cable between their trolleys, irrespective of the relative lengths of such cable sections, are now all taut. Packages 11 to 17 inclusive, therefore, will reach the discharge point sequentially with further operation of the winch.

Consequently, as the unloading proceeds, the cargo packages or units are conjointly redistributed over the load-carrying portion of the aircraft by being automatically respaced in this manner so as to maintain automatically the center of gravity of the cargo, and hence of the airplane, within safe operating limits at all stages of the unloading. Of course, the particular spacing between cable gripping points required will vary with the size, weight and aerodynamic properties of the airplane, and with the weight and number of the cargo elements, and the uniformity of the weight of such elements may affect the relative lengths of the sections of interconnecting line. The heavier the packages the further apart they should be spaced. As indicated by the drawings (especially Figure 2), assuming the load units to be of approximately equal weight, the relative spacing, and hence the amount of slack cable in the illustrated case, is made relatively small between the first bundles, and progressively increases toward the forward, or last bundles to be unloaded. This is as would normally be expected, assuming the center of gravity of the load to be maintained ideally at substantially the middle of the group of load units in their initial positions, since the units immediately following the first one or ones must do so closely in order to effect any noticeable compensation for the tendency to shift in overall center of gravity with discharge of the first units; whereas when only a few load units remain it is desirable that they be spread out widely and balanced about the ideal center until finally the last one or ones must pass beyond it toward the opening. By this time any resulting shift of the center of gravity is small because the weight of the remaining load is not great as compared to the weight of the empty airplane.

Figure 3:
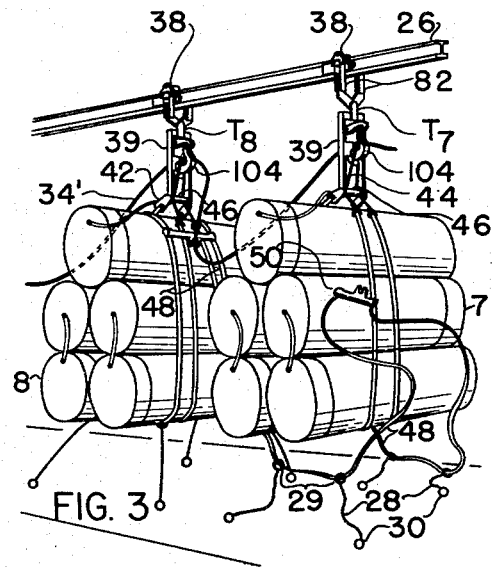
Figure 3 is a perspective view of two load units, one being in process of release for shifting lengthwise of the aircraft.

Referring now to the details of construction and operation of preferred illustrative mechanisms utilized in such a load discharging and redistribution system, Figure 3 shows a typical installation of two load bundles such as 7 and 8, carried on trolleys T7 and T8, bundle 7 being in the process of release from its floor anchor-connections with bundle 8 still anchored. Each trolley comprises a pivotally jointed frame 39, on the upper portion of which are journaled wheels 80 for travel on the track 26 comprising a section of I-beam suitably supported from the ceiling of the compartment. These wheels respectively engage the opposite lower flanges of the rail beam. Conveniently, each bundle or load unit is suspended from its trolley by a pair of straps 40 encircling the bundle.

With a load unit in its normal flight position it is not only encircled by the supporting straps 40 but also by a second pair of straps, 48, constituting an anchor or tie-down device, the ends of which are secured releasably by a spacer bar 50. The straps are disengaged from this bar to release the bundle from its anchored position when the slack in the cable 34' between an anchored unit and that preceding is taken up. Inasmuch as the straps 48 pass through rings 29 secured to the ends of the floor anchor ropes 28, release of the straps 48 frees the bundle for movement with its trolley.

The construction and operation of the spacer bar 50 is illustrated in detail in Figures 11 to 14, inclusive. At each end it has strap securing provision for the opposite ends of straps 48, such as a slot 54 at one side and a loop 56 at the other side. One end of each strap is secured permanently to its end of the bar by being passed through the longitudinal slit 54. The other end of each strap is secured to a ring 56. Each ring is held releasably to its end of the bar in a notch 58 formed in the side edges of a pair of spaced lugs 60 projecting from a side of the bar, such notch being inclined toward the bar from its bottom to its opening.

Extending over the length of the bar 52 and parallel with it is a rod 62 supported rotatably in concentric holes formed in the pairs of lugs 60 at opposite ends of bar 52, and the central portion of such rod is similarly supported in a pair of spaced lugs 64 projecting from the same side of bars 52 as lugs 60 and in alignment with such lugs. A tongue 68 integral with such rod is received between the central lugs 64. Keeper fingers or hooks 66', also integral with the rod, are adapted to bridge the notches 58, and together with ring release cams 66, are received between the lugs 60 of the respective pairs of such lugs. The release cams 66 are so formed that rotation of rod 62 to withdraw keepers 66' from their ring-securing positions across the inclined notches 58 will turn the release cams in counterclockwise direction as viewed in Figures 13 and 14. By such movement the cams create a thrust on the strap rings, forcing them out of the inclined notches because of the increasing radius of the peripheral cam surface bearing against the rings, thus effecting disconnection of the straps 48 to release the load unit from its floor connections.

To turn rod 62 for effecting the foregoing releasing operation of anchor straps 41, tongue 68 is swung by the pull cable 34 as it is pulled to remove the slack in it in the first step in the unloading of a bundle. Tongue 68 normally hangs downward from rod 62 as shown in Figure 11, and has a downwardly opening deep notch 70 formed in its end. The tongue is releasably held in such position by a catch-plug 76 which engages a detent socket 78 carried by the bar 52 to prevent the tongue from being swung upward by small forces accidentally erected on it. A swingable arm 72, pivoted to the tongue at one side of such notch normally closes the notch end. The arm is held resiliently in this position by detent springs 74 shown in Figure 12.

Because the cable 34 is gripped at spaced points by successive trolleys T1, T2, etc., and by a particular trolley at a point located considerably above the tongue 68 of the anchor mechanism for the adjacent load unit at the side remote from the discharge opening, the slack portion 34' of the cable draped between the adjacent load units may be lodged in the tongue notch 70 behind bar 72. When the cable is drawn taut its action will be to swing the tongue upward, thus rotating rod 62 to disengage the strap rings 56 from their notches in bar 52. Simultaneously the weight of the anchor harness is carried by the arm 72 suspended momentarily from the cable, which exerts a force sufficient to swing the bar out from behind the detent spring 74, thus freeing the cable from notch 70. The anchor straps and bar 52 then drop altogether free of the bundle to the floor. In Figure 3, the bar 50 and straps 48 are shown dropping to the floor, whereas in Figure 4 this operation is complete. Since the tow cable is gripped at a point by each trolley, a load unit will not be thus released until the preceding unit has actually been moved a certain distance along the rail, taking up the slack in the cable section following such preceding unit.

Each individual load unit is normally doubly secured in position, both by the floor connections and by trolley locking means, and both connections must be removed before the load unit can be displaced for redistribution of the load units or for unloading. After a bundle is released of its floor connections, therefore, the ensuing operation is the release of the trolley for movement along the track. The trolleys may be locked against movement along the track by engagement with them of yokes 38 pivoted at selected stations upon the top of the rail 26. Normally these yokes are turned to dispose their spaced side plates 82 projecting downward to lie at opposite sides of their respective trolleys. Each side plate has a notch 84 in it adapted to straddle a trolley as shown in Figure 6. Each yoke 38 is carried by a shaft 89 journaled in a fixed bracket 86 secured by bolts to the track at a selected location.

When locked, the trolley frame hangs vertically with its upper end fitted in the notches of its yoke 38, but when the trolley is swung forwardly about the pivot axis of its wheels 80 by a pull on the cable, after release of the floor anchor from its load unit, the resulting inclination of the trolley frame, as shown in Figure 7, permits slight forward travel of the trolley wheels along the track 26, effecting swinging of yoke 38 and withdrawal of the trolley from the yoke notches. The yoke is then rotated oppositely to swing its side plates 82 into upwardly projecting positions as shown in Figure 8, by the action of a coil spring 87 encircling the yoke shaft 89. In this position they cannot interfere with the passage of other trolleys moving on the track.

In the construction of each trolley, the opposite wheels 80, engaging the track, are mounted respectively on axles supported at the upper ends of trolley hanger arms 83 forming the upper portion of the trolley frame. The hanger arms in turn are bolted at 90 respectively to the branches of a yoke 88 beneath and straddling the track. This trolley frame yoke is pivotally joined by a bolt 92 extending lengthwise of the track to a U-shaped connector 94 which in turn is connected pivotally about an axis directed transversely of the track between the opposite side bar elements of the lower trolley frame portion 39. The latter connection is by bolt 96 extending through such bars widthwise of the trolley, and since it is disposed at right angles to bolt 92, the upper and lower sections of the frame are relatively swingable universally.

Figure 4:
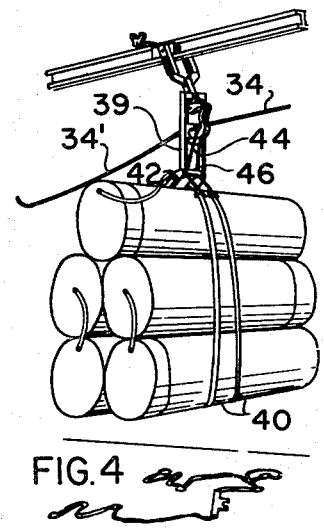
Figure 4 is a perspective view of a load unit fully released and being shifted toward the discharge opening of the cargo compartment.

Bolt 96, extending transversely of track 26, enables the hanger arms 82 to swing relative to the track for releasing the trolley from its latch yoke 38, as shown in Figures 4 and 7, without lifting the entire load unit or bundle appreciably, as would be necessary if this pivot were not provided. Moreover, pivoting about the longitudinal bolt 92, of the bundle carried directly by the lower section of frame is desirable to ease the strain on the trolley's parts when the load tends to sway sideways, such as during unloading of the aircraft if it should bank. Any tendency for a trolley and its load to twist about a vertical axis, causing strain on the bolts 98 serving as axles for the wheels 80, and other related parts of the trolley, is counteracted by guide rollers 100 supported from brackets 101 bolted to the inner faces of the longitudinally-extending side plates 102 of the carriage proper, as shown in Figure 9. These side plates are securely fixed to the inner faces of the hanger arms 83, and the rollers 100 bear directly against the opposite sides of the web of the track beam 26 at points spaced longitudinally of it from the wheels 80 to create moment arms resisting twisting or rotation of the trolley.

Each bundle is supported by the straps 40, which at one end are secured permanently to the lower portion 39 of the trolley frame from a pair of swingable connector links 42. The free ends of the straps 40 are connected to the opposite ends of a supporting loop of wire cable, 44. This cable loop passes over the top of the load, beneath a pivotal shaft 46 journaled in the lower ends of the two side bars of frame 39 carrying links 42 at its opposite ends, and is hung on a load hook 104. As shown in Figure 9, this hook is mounted pivotally on a transverse horizontal bolt 106, in the space between the adjacent faces of brackets 108 projecting inwardly from the side bars of frame 39. The end of shank 110 of the hook 104 is notched to receive the tow cable 34 when the hook shank is swung upward about pivot bolt 106 into the substantially vertical position in which it supports the cable loop 44. The tip end of the shank projects outwardly from the shank proper, forming fingers 112 interengageable with a latch hook 114 to hold the cable-holding, load hook's shank 110 in raised position. The latch hook, pivoted about a horizontal bolt 116 extending transversely through the upper end of the lower frame part 39, is normally held in locked engagement with the load hook fingers 112 by the weight of the unit load package suspended from the hook eccentrically of its pivot 106, tending to swing its shank 110 downward and thus enforcing such engagement. A helical spring 118 encircling bolt 116, coacting between the frame and the latch lever 114, presses the latch hook down against the load hook shank, and also prevents the latch hook from swinging idly when the trolley is unloaded.

Carried beneath the track at a point overlying the cargo discharge opening of the aircraft is an abutment 122 engageable by the upright lever 114' forming part of the latch hook 114, and operable by such engagement to stop such latch hook lever while the trolley continues its movement along the track. Such relative movement of the hook lever and trolley overcomes the restraining force of the spring 118 and swings the latch hook upward to release it from the trolley hook as the trolley moves over the hatch opening. Upon release of the hook 104 it is immediately swung downwardly by the weight of the bundle acting on the cable loop 44, and when the shank has been swung downward sufficiently far the cable loop passes freely over the end of the hook's shank. The abutment 122 may be fixedly positioned or adapted for positional adjustment, as desired.

Figure 5:
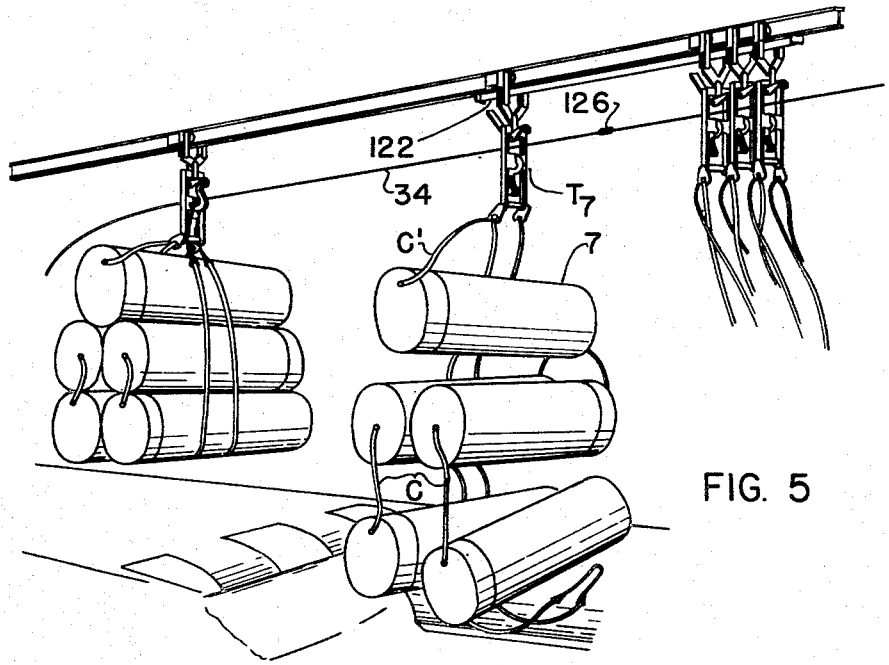
Figure 5 is a perspective view of two load units, one in process of being dropped through the discharge opening and the other approaching such opening.

The adjacent ends of brackets 108 are complementarily recessed to form a central, upwardly opening socket into which may be inserted an enlargement 126 secured on the tow cable (Figures 5 and 10). The slot 132 between the adjacent ends of brackets 108 is sufficiently wide to pass the cable but the end walls of the socket at opposite sides of the slot retain the enlargement 126. Spring fingers 128, secured to the adjacent faces of brackets 108 and inclined upwardly and toward each other, yieldably hold the enlargement in the socket against upward releasing movement, and must be forcibly spread apart to allow the enlargement to enter or leave the socket.

As shown in Figure 10, the load hook 104 is integral with a rotatable tow cable releasing cam 130. This cam comprises a disk curved eccentrically about pivot 106 and not appreciably thicker than the thickness of the cable 34. When the hook shank 110 is swung downward to release the load unit, such cam simultaneously is pressed upward between the brackets 108 into engagement with the cable enlargement 126. The cam exerts sufficient force on the enlargement to force it upward out of the socket between the spring fingers 128. This frees the cable from the trolley for continued winding onto the winch 32 shown in Figure 1. In Figure 5, the load bundle designated 7 is in process of release from the trolley T7.

Provision is made for parachuting the bundles safely to earth on dropping them. As illustrated, the bundles carried by the trolleys may be made up of groups of containers linked together in tandem, as a "daisy chain," the removable cover of one container being connected by a length of cord C to the body of the other. Thus the cover of the uppermost container is the first to be removed, this cover being connected directly to the trolley by a length of cord C'. After the parachute canopy of the uppermost container opens, it will be retarded in falling and the second container will fall away from its cover secured to the first container, allowing its parachute to open, and so forth. This technique is not novel, but it is a desirable adjunct to be used in connection with my novel unloading system, as will be apparent.

After their loads are dropped the individual trolleys coast or are further drawn to the end of the track where they gang together and remain out of the way until pressed into use again upon reloading the aircraft.

If desired, the tow cable enlargements or sleeves 126 forming cable gripping points, may be made adjustable in position along the cable to enable selection at will of the lengths of slack cable between the several load units with the aircraft loaded. This may be desirable when the load distribution is altered on successive trips. Alternatively, a greater number of such sleeves may be provided, closely spaced at equal intervals, enabling the selection of predetermined sleeves for gripping purposes without shifting the position of any of them along the cable. Several units may be released from their floor connections before a single unit has been discharged from the airplane because of the distance traveled by a preceding trolley in reaching the hatch opening being greater than the slack-length of cable between that trolley and such succeeding units. The length of cable between trolleys will, of course, be selected in accordance with the number and relative weights of the several load units in relation to the length of the cargo compartment in which they must be stored and the location of the discharge hatch relative to the cargo space.

I claim as my invention:

1. Cargo handling mechanism for unloading a plurality of load units successively from an aircraft through a discharge opening therein, comprising a track extending through a storage space within the aircraft to the discharge opening, a plurality of carriers carried by said track and operable to support respective load units for moving along the track to the discharge opening, individual securing means normally operable to hold said load units in spaced series positions along said track, and tow cable means interconnecting said carrier and operable to effect release of said carriers in delayed succession from their securing means and substantially simultaneously with their release to move them toward the discharge opening with predetermined spacing between succeeding moving carriers.

2. Cargo handling mechanism operable to maintain substantially constant the location of the center of gravity of the cargo remaining in an aircraft while the aircraft is being unloaded, comprising a track extending lengthwise of the aircraft's cargo space, a cargo discharge opening beneath said track, a plurality of cargo carriers engaging said track and operable to hold cargo releasably for movement along said track, individual securing means operable to hold said cargo carriers in predetermined spaced relation along said track during transportation in the aircraft but readily disconnectable for movement to the unload individual carriers, and carrier towing means interengaging carriers and their securing means, operable concomitantly to effect release of successive carriers from their securing means and movement thereof toward said discharge opening in order, with predetermined delay in the release and movement of successive carriers, thereby to effect progressive shift of said carriers cumulatively toward the discharge opening.

3. Cargo handling mechanism as defined in claim 2, in which the carrier towing means comprises a cable interconnecting the carriers and held thereby individually with predetermined slack lengths of said cable draped between the holding points of the carriers when the carriers are secured in their stowed positions, said slack lengths of said cable determining the distribution and relative spacing of said carriers when they are being towed by said cable towards the discharge opening.

4. Cargo handling mechanism as defined in claim 3, in which the slack lengths of cable are increasingly longer between succeeding carriers commencing with the slack length between carriers nearest the discharge opening.

5. Cargo handling mechanism as defined in claim 3, and cable holding means on each carrier and operable to hold the cable releasably during movement of the corresponding carriers, and releasing means operable simultaneously to release the cable from said cable holding means and the cargo from the carrier.

6. Cargo handling mechanism as defined in claim 5, and cable enlargements located at spaced points on the cable, engageable by the cable holding means, and establishing the lengths of the several cable slack lengths of the several cable slack lengths draped between the carriers.

7. Cargo handling mechanism as defined in claim 6, in which the cable enlargements consist of plug means encircling the cable, and the cable holding means comprises socket means operable to receive said plug means, the releasing means including cam means engageable with said plug means and operable to force said plug means from its socket to release the cable.

8. Cargo handling mechanism for individual load units carried by a vehicle, comprising releasable securing means operable to secure the individual load units in their respective stowed positions, a tow cable linked with said securing means and operable by tautening said cable to effect operation of said securing means to release the individual load units for movement, and carrier mechanism operable to transport each load unit, and to grip the tow cable to be towed thereby for moving the load units toward a discharge opening in the vehicle.

9. Cargo handling mechanism as defined in claim 8, in which the securing means comprises a strap encircling a load unit, and connecting means securing the strap ends and including releasing mechanism engaged by the cable and operable by tautening movement of the cable to release at least one of said strap ends.

10. Cargo handling mechanism as defined in claim 9, the connecting means having a recess adapted to receive the releasable lever means linked with the cable, pivoted on the connecting means and swingable by tautening the cable, and cam means operable by swinging of said lever means to force the releasable strap end from said recess for release of the strap end from the connecting means.

11. Cargo handling mechanism as defined in claim 8, in which the securing means comprises a pair of straps encircling a load unit and secured to the body of the vehicle, and releasable connecting means joining the opposing strap ends and linked with the cable, including a bar to which one end of each strap is fixed and having notches therein near each end, connectors on the opposite strap ends, normally lodged in said bar notches, respectively, lever means pivoted to said bar, engaged by the cable, and swingable by tautening thereof, a shaft rotatable by swinging of said lever means, and cam members carried by the opposite ends of said shaft and having hook portions located to bridge said bar notches and operable to secure said strap end connectors in their respective notches in the position assumed by said lever means when the cable is relaxed, and said shaft being operable upon rotation by swinging of said lever means by tautening of the cable first to swing said hook portions away from positions bridging said notches and then to move said cam members to connectors from their respective notches.

12. Cargo handling mechanism as defined in claim 8, in which the carrier mechanism comprises an overhead track, individual trolleys each having a pivotally jointed frame including an upper frame portion, wheels carried by said upper frame portion and engageable with said track, a lower frame portion, straps adapted to embrace a load unit, permanently secured by one end to said lower frame portion, and having a hanger loop connecting their opposite ends, a loop-supporting hook supporting said loop and pivotally mounted in said lower frame portion, and latch means engageable with said hook and pivoted in said lower frame portion for swinging between hook-securing and hook-releasing positions; and abutment means disposed adjacent to said track near the discharge opening of the vehicle and engageable with said latch means to swing the same from hook-securing position to hook-releasing position as the trolley moves thereby, to effect disconnection of said hanger loop from said loop-supporting hook to free the load unit from the straps for discharge through the discharge opening.

13. Cargo handling mechanism as defined in claim 12, and enlargements on the cable at spaced points, each trolley including a cable-enlargement socket operable to receive said cable-enlargements to grip the cable, and cam means connected for rotation by the loop-supporting hook and projectable by such rotation into the cable-enlargement socket of its trolley to effect expulsion of the cable enlargement from such socket to disconnect the cable from the trolley.

14. Cargo handling mechanism as defined in claim 8, in which the carrier mechanism comprises an overhead track, individual trolleys each having a pivotally jointed frame including an upper frame portion, wheels carried by said upper frame portion and engageable with said track, a lower frame portion, straps adapted to embrace a load unit, and carried by said lower frame portion, the upper and lower frame portions being relatively swingable about a horizontal axis disposed transversely of said track, and locking members mounted at spaced points along said track, engageable with said upper frame portions of the respective trolleys and operable to lock the trolleys against movement along the track but releasable by conjoint swinging and translation along the track of the upper frame portion of the trolley effected by a pull exerted by the cable.

15. Cargo handling mechanism as defined in claim 14, pivot means supporting the locking members from the track for swinging from trolley-holding position into an inoperative position clear of the track, and spring means engageable with each locking member and operable to move it into its inoperative position when it is disengaged from its trolley.

16. Cargo handling mechanism for discharging load units in rapid successive order through a discharge opening of an aircraft in flight while minimizing the shift in location of the center of gravity of such cargo, comprising means supporting individual load units of cargo for movement toward the discharge opening, shifting means operable to shift a plurality of such load units simultaneously toward the discharge opening, means connecting said shifting means at relatively closed spaced locations to the two units in line nearest the discharge opening, means connecting said shifting means at relatively more widely spaced locations to succeeding units progressively further removed from such opening, and means operable to disengage said load units successively from said supporting and shifting means upon reaching the discharge opening for discharge movement therethrough.

17. Cargo handling mechanism for discharging individual load units in rapid successive order through a discharge opening of an aircraft in flight while minimizing the shift in location of the center of gravity of such cargo, comprising a cable, means connecting to said cable at relatively closely spaced intervals along the length thereof a plurality of the load units disposed relatively close to the discharge opening and arranged generally in line with the discharge opening, means connecting to said cable at progressively relatively more widely spaced intervals along the length thereof succeeding load units progressively farther removed from such opening, means operable to draw said cable toward the discharge opening for advancing the load units toward and successively to such opening, and means operable to disengage the load units successively from the cable upon reaching the discharge opening for discharge movement therethrough.

18. Cargo handling mechanism defined in claim 17, and additionally comprising releasable anchor means normally securing each of the individual load units to the aircraft independently of the other such units, respectively, against involuntary shifting about in such aircraft effected by movement of the aircraft, the cable extending normally slackly between succeeding load units and becoming taut between succeeding load units commencing with the two such units in line nearest the discharge opening and progressing successively to those progressively further removed from such opening as the cable is drawn toward the same, and means operable to release the anchor means of each load unit by tensioning the section of cable between such load unit and the adjacent load unit nearer the discharge opening.

19. Cargo handling mechanism for discharging load units in successive order through a discharge opening of an aircraft in flight while minimizing the shift in center of gravity thereof, comprising means movably supporting individual load units stored in close proximity and arranged in a line extending toward the discharge opening, a cable, means releasably connecting said cable to each of said load units with predetermined slack length of said cable draped between said load units in stored position substantially greater than the respective distances between adjacent load units in stored relationship, means for drawing of said cable and thereby said load units toward said discharge opening, and abutment means located at said discharge opening and cooperating with said cable releasable connecting means for releasing such load units as they arrive successively at such discharge opening, by engagement of such connecting means with said abutment means, respectively.

References Cited in the file of this patent

UNITED STATES PATENTS

| Number | Name | Date |
| --- | --- | --- |
| 1,554,765 | Shaffer | Sept. 22, 1925 |
| 2,343,638 | Bock | Mar. 7, 1944 |
| 2,345,615 | Manson et al. | Apr. 4, 1944 |
| 2,379,364 | Leland | June 26, 1945 |
| 2,390,230 | Trusty | Dec. 4, 1945 |
| 2,426,862 | Cunningham | Sept. 2, 1947 |
| 2,441,367 | Noville | May 11, 1948 |